Jan. 21, 1941.    N. W. REDMER    2,229,473

TRIPOD

Filed March 4, 1939

INVENTOR
Norman W. Redmer
By
McLaughlin & Wallenstein
Attys

Patented Jan. 21, 1941

2,229,473

UNITED STATES PATENT OFFICE 2,229,473

TRIPOD

Norman W. Redmer, Chicago, Ill.

Application March 4, 1939, Serial No. 259,724

5 Claims. (Cl. 248—191)

My invention relates to photographic tripods, and it has for its object the provision of an improved photographic tripod having certain advantages of construction, function and the like, as will be clear from the following description.

Figure 1:
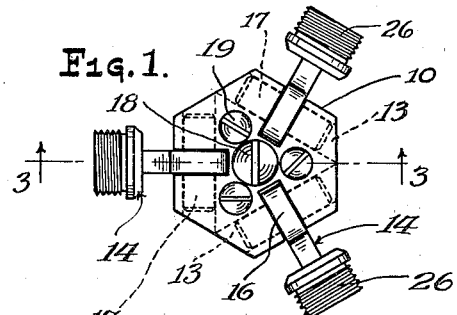
Fig. 1 is a plan view of the tripod with the legs removed therefrom to conserve space and the hinge members to which they are normally secured extended out in a radial position.
Figure 2:
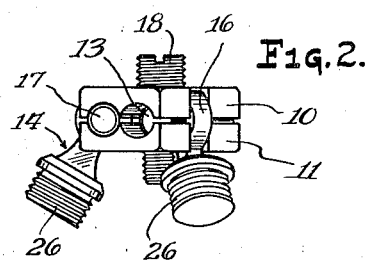
Fig. 2 is an elevational view of the portion of the tripod shown in Fig. 1.

Referring now to the drawing, I show a head comprising a top member 10 and a bottom member 11, although, as will be made clear, the relative positions of these two members may be reversed. Each of the members 10 and 11 is hexagonal, and they are in general complementary to each other. Alternate sides are provided with vertical edge slots 12, and, extending at right angles to the plane of the slots and parallel with the contiguous edge of the hexagonal members, tubular openings 13, formed in the opposing faces of the two members 10 and 11, are provided. Looking at Fig. 1, which shows the position of the tubular openings 13 in dotted lines, it will be seen that these tubular openings terminate side by side on alternate sides of the hexagonal members and would cross each other if extended. The result is a regular design which is taken advantage of, in a manner to be described, in the production of the tripod.

Each leg of the tripod has a top pivot member 14 with an upper head portion 16 of such a size as to fit snugly within one of the slots 12. The head portion 16 carries a hinge pin 17 which lies within the tubular opening 13 on opposite sides of the vertical edge slots 12. The relative dimensions are such that the pivot pin 17 will always maintain a space between the members 10 and 11 so that, in a manner to be described, tension may be maintained on the hinge pin at all times or looseness or floppiness of the tripod legs avoided.

The center mounting screw 18 extends through a center opening in the member 10 and has a lower portion threaded into the member 11. The upper portion of the center mounting screw 18 has a wider threaded section with a shoulder which engages over the top face of the member 10 to firmly clamp the center of the members 10 and 11 together. The lower end of the center mounting screw 18 projects through the member 11, and, by employing threads at the top and bottom of the screw 18, which are standard in cameras, I am able to adapt the tripod for use with the European as well as the American cameras which have their recesses for attaching the tripods to the camera on different standards.

Centered around the members 10 and 11, in the form of a triangle, are three screws 19. They are recessed in the member 10, as shown, the head acting as a stop and engaging over a shoulder in the member 10. The threaded shank engages in the member 11. It will be seen that each of these screws is adjacent two of the hinge pins so that each hinge pin has two screws lying along its edge and both sides of each hinge pin may be kept tight at all times. Indeed, the members may be moved to the position shown in Fig. 1 with the legs attached to the member 14, and the legs will stay exactly where they are put, even in a horizontal position. This is accomplished without any binding.

Figure 3:
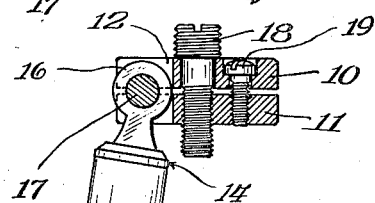
Fig. 3 is a sectional view taken through the tripod with the legs attached, the figure being such as would be taken through the head along the line 3—3 of Fig. 1.
Figure 3:
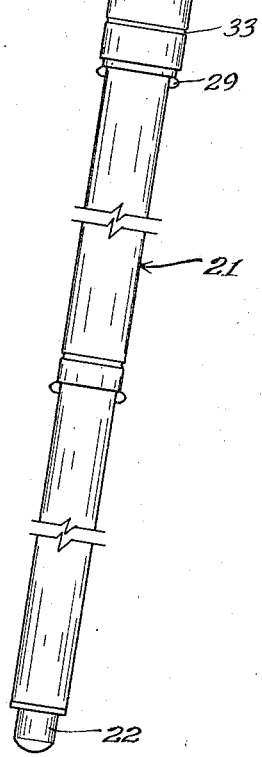

The legs of the tripod, as indicated generally by the reference character 21 of Fig. 3, are made up of a plurality of mutually telescoping members, that is, wherein the lowermost member telescopes into the member immediately above it and so on in the usual manner until, when the legs are fully telescoped, all of the telescoping tubes comprising the legs are nested within the uppermost tubular member. The number of such telescoping members may vary, but will usually run from four to six, depending upon the design. The lowermost tubular member is provided with a foot 22 for resting upon the ground, floor or other generally plane surface, and, in accordance with the preferred arrangement, the foot 22 may be frictionally carried at the bottom end of the lower tubular member and be provided with a suitable friction member such as a rubber cover, in accordance with usual principles of design. The uppermost tubular member 23 (Fig. 4) is provided with internal threads 24 for attachment to the threaded portion 26 of the member 14.

Figure 4:
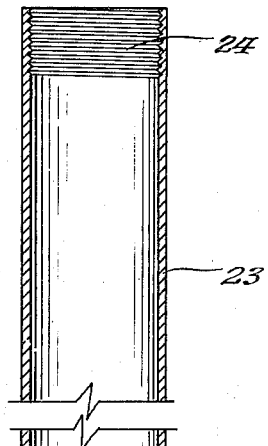
Fig. 4 is an enlarged sectional view taken through a portion of one of the legs to illustrate a feature of construction.
Figure 4:
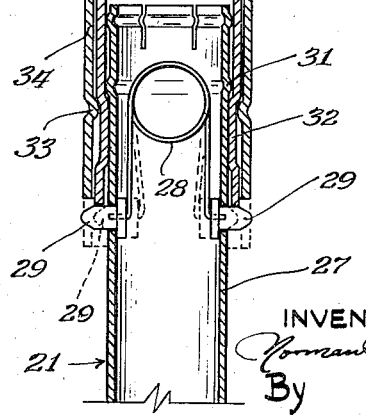

Between each pair of tubular members comprising the legs of the tripod are locking plungers so arranged as to spring out when the tubular members are fully extended to engage under the lower edge of the overlying member and prevent collapsing of the legs. These plungers must be released by suitable means such as grasping with the fingers in order to collapse the legs of the tripod and I provide means associated with the tripod itself for securing this result. Referring now to Fig. 4, in which the upper portion of the leg of the tripod is shown in section on an enlarged scale, within the tubular member 27, a torsion spring 28 is placed, to the ends of which locking plungers 29 are secured. These locking plungers extend through apertures in the tubular member 27 and, as shown, are adapted to extend into engagement with the lower edge of the upper tubular member 23 when the tubes are entirely extended. The torsion spring is held in place by virtue of the fact that the spring action holds the locking plungers 29 in the aperture of tube 27. By providing annular formations on the two tubes in the manner indicated, free sliding action is permitted, but the limits to which the tubes may be withdrawn from each other are established, for example, as the drawing shows, which is the extreme to which the tubular members may be extended. In this form, there is an annular ridge 31 on the outside of the tubular member 27 and an annular ridge 32 of greater area extending inwardly from the tubular member 23. This forms a pair of shoulders which limits the movement of the two tubes. The annular formation 32, however, leaves annular exterior recesses into which an annular ridge 33 on a short sleeve 34 extends. This sleeve 34, which functions as a releasing sleeve, is therefore held in position but allowed limited longitudinal movement co-extensive with the width of the formation 32 of the tube 23. The normal position of the releasing sleeve 34 is shown in full lines in the drawing. By, however, pulling the sleeve to the position shown in dotted lines, the locking plungers 29 are forced inwardly to the position indicated in dotted lines, and the tubular member 27 can then be pushed within the tubular member 23 without any requirement that the locking plungers be grasped with the fingers. To collapse the legs of the tripod, therefore, it is only necessary to grasp the tubular member 27 in one hand and the releasing sleeve 34 with the fingers of the other hand. By pushing the hands together, the tubular member 27 is slid within the tubular member 23 and the smaller tubular members can be successively inserted in the same manner until the legs are entirely assembled in carrying position.

By employing the features described hereinabove, I have been able to make an extremely strong, compact, but light and easily handled tripod at considerably less cost than has been necessary with the tripods of equivalent strength, durability and convenience. The legs may be swung completely around their pivots in either direction so as to use either side of the camera fastening screw 18. Even after considerable wear, the legs may be kept tight on their pivots and I have found that, using the construction which I employ, sufficient spring is obtained in the members 10 and 11 that usual lock washers and the like are not required to prevent loosening of the screws.

While I prefer to utilize all of the novel features described above and follow substantially the structure disclosed in the drawing, I may make certain modifications and employ only certain of the features without departing from the spirit of the invention as expressed in the accompanying claims.

What I claim as new and desire to protect by Letters Patent of the United States is:

1. In a camera tripod, a foot member comprising a plurality of mutually telescoping tubes, spring pressed locking plungers carried by one tube and projecting through ports therein to engage a lower edge of an associated tube to hold such two tubes in extended relation, and a releasing sleeve disposed over the first-mentioned tube and adapted to depress said locking plungers when moved in relation thereto.

2. In a camera tripod, a tube, a second tube adapted to be telescoped within the first tube, means to prevent complete withdrawal of the second tube, spring-pressed locking plungers carried by the second tube for engagement at the lower edge of the first tube, and a sleeve extending around the lower portion of the first tube and adapted to be slid downwardly to release said plungers.

3. In a camera tripod, a leg member comprising a plurality of telescoping tubes, locking plungers adapted to engage the lower edge of each telescoping tube when the leg is extended, and a slidable means mounted upon the outer edge of the outermost tube for engaging the contiguous locking plungers and depressing them to render them ineffective.

4. A telescoping member for a camera tripod leg or the like, comprising a plurality of mutually telescoping tubes, said tubes being of graduated diameter, and each tube having a sliding fit in the tube of next largest diameter, except the outermost tube which houses all of said tubes when in full telescoped relation, each tube except the outermost tube having spring pressed plungers extending through apertures in the side walls thereof and engaging a lower edge of the next largest tube when extended, and a sleeve slidable on said outermost tube to depress the plungers engaging the end of the outermost tube to release said plungers and permit sliding the tube carrying the plungers within the said outermost tube.

5. In a camera tripod, a tube, a second tube in telescoping relation within the first-mentioned tube, means to prevent complete withdrawal of the second-mentioned tube, spring-pressed locking plungers carried by the second tube engaging against a contiguous edge of the first tube when the second tube is withdrawn from the first tube, the parts being so constructed and arranged that endwise pressure of the tubes in a direction to telescope them is ineffective to release said plungers, and sleeve means carried by the first tube, and of greater diameter than said tube, said sleeve means being normally out of contact with said plungers but capable of engaging and depressing the same when said sleeve means and plungers are moved relatively to each other.

NORMAN W. REDMER.